April 26, 1938.  H. E. OLSON  2,115,427

VIBRATION DAMPER

Filed Feb. 25, 1935

INVENTOR.
Herbert E. Olson
BY
ATTORNEY.

Patented Apr. 26, 1938

2,115,427

UNITED STATES PATENT OFFICE 2,115,427

VIBRATION DAMPER

Herbert E. Olson, St. Joseph, Mich., assignor to Reo Motor Car Company, a corporation of Michigan Application February 25, 1935, Serial No. 8,045

5 Claims. (Cl. 74—574)

This invention relates to vibration dampers, and more particularly to a device of this character for controlling and suppressing vibrations set up in the crank shafts of internal combustion engines.

The principal object of the invention is to provide a vibration damper of the above character having an inertia member which is positioned in balanced relation to the axis of the crank shaft and so mounted as to bring about a counter-balancing effect through movement in all directions.

Other objects and advantages of the invention will become apparent from a reading of the following description taken in connection with the accompanying drawing in which.

Figure 1:
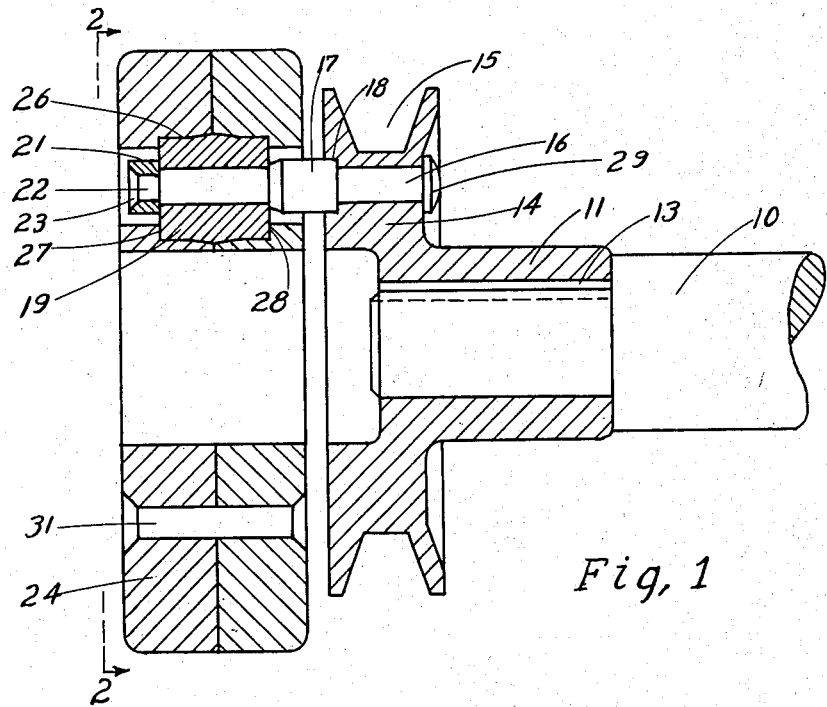
Fig. 1 is a vertical longitudinal sectional view taken through one end of the crank shaft and the damper.
Figure 2:
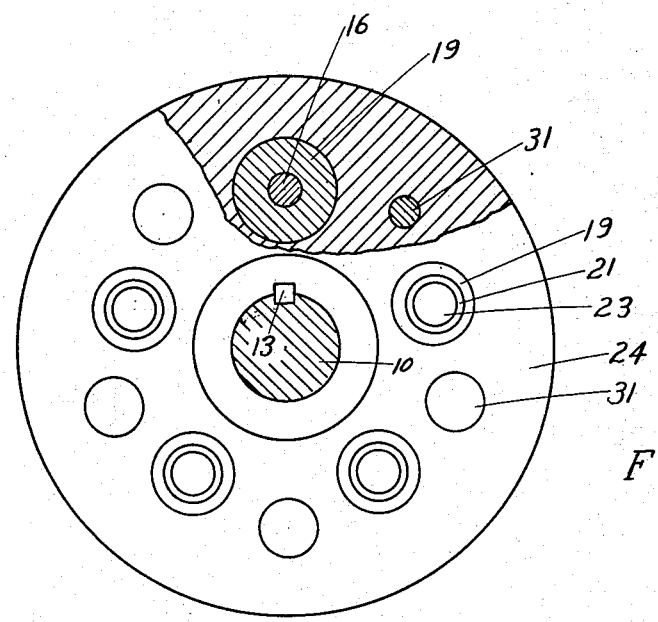
Fig. 2 is an end elevational view of the damper taken on the line 2—2 of Fig. 1.

Referring now to the drawing, reference numeral 10 indicates the forward end of the crank shaft of an internal combustion engine having the vibration damper comprising the present invention mounted upon the end thereof. This damper comprises a hub 11, keyed to the crank shaft as at 13 and provided with a radially extending flanged portion 14 at the outer end thereof. The periphery of the flanged portion 14 may conveniently be grooved as at 15 to provide a pulley for receiving a belt to drive the engine fan (not shown).

In accordance with the present invention it is desirable that the inertia member of the damper be evenly balanced relative to the axis of the crank shaft and mounted in axially spaced relation to the hub in a manner to permit movement in all directions relative thereto. To this end a plurality of equi-distantly spaced pins 16 are provided around the flanged portion 14 of the hub and extend therefrom in an axial direction. Each of the pins 16 is provided with an enlarged shoulder portion 17 adapted to seat in recesses 18 formed in the outer face of the flange 14. A rubber bushing 19 is press fitted on each of the pins 16 against the shoulder 17 and further held in place by spacer collars 21 positioned on reduced portions 22 of the pins at the outer ends thereof.

A two-part inertia member 24 adapted to be carried entirely by the rubber bushings, is provided with a plurality of equi-distantly spaced enlarged bores to receive the pin and bushing assemblies and a plurality of annular recesses 26 are provided centrally of the bores to receive the bushings 19 thus forming shoulder portions 27 and 28 within the bores to maintain the inertia member upon the bushings. It will be noted that the annular recesses 26 are deeper at their central portions than at the ends thereof, the purpose of which will later appear.

In assembling the damper, the pins 16 and rubber bushings 19 are first assembled as a unit and then the inner portion of the two-part inertia member is positioned over the pins in engagement with the inner end of the bushings. The pins are then positioned in the bores of the flanged portion 14 of the hub member 11 and the heads 29 of the pins deformed. The outer portion of the inertia member is then slipped over the rubber bushings and the two-parts are drawn together as by rivets 31.

The rubber bushings in their original form are somewhat longer than the width of the annular recesses 26 but are deformed when the two-parts of the inertia member are drawn together so that they take the form shown in Fig. 1 wherein the central portions thereof extend into the deeper portions of the recesses 26. By constructing the recesses 26 in this manner the rubber of the bushings 19 is prevented from being squeezed between the two-parts of the inertia member when they are drawn together. It may also be noted that the action of the inertia member may be varied by varying the size and hardness of the bushings and the extent to which they are compressed.

After the inertia member has been secured to the rubber bushings 19, the spacer members 21 are positioned on the reduced portion 22 of the pins and the ends of the pins deformed as at 23.

The vibration damper thus provided is capable of movement in all directions to effectively dampen out any unbalanced forces of the engine transmitted through the crank shaft 10 and is an improvement over previous dampers of similar character since it is capable of dampening out axial as well as radial thrusts of the crank shaft.

Various modifications of the device, as shown, may be made without departing from the spirit or scope of the invention which is to be limited only by the appended claims.

What is claimed and desired to be secured by Letters Patent is:

1. A vibration damper comprising a hub provided with a flanged portion, a plurality of spaced pins extending in an axial direction from said flanged portion, an inertia member carried by said pins, and a rubber bushing between said inertia member and each of said pins forming the sole connection therebetween, said rubber bushings being sufficiently spaced axially from said flanged portion to permit axial movement of said inertia member.

2. A vibration damper comprising a hub having a radially extending flanged portion provided with a plurality of recesses in a face thereof, pins extending through said flanged portion in an axial direction and having shoulder portions engaging said recesses, rubber mountings carried adjacent the ends of said pins, and an inertia member carried by said rubber mountings.

3. A vibration damper comprising a hub having a radially extending flanged portion, axially extending pins secured to said flanged portion, rubber mountings carried by said pins, an inertia member secured to said rubber mountings, and axially extending spacer means carried by said pins between said rubber mountings and said flanged portion to position said inertia member in axial spaced relation to said hub.

4. A vibration damper comprising a hub, pins carried by said hub, a two-part inertia member having bores extending therethrough and recesses extending radially from said bores which are deeper at their central portions than at their ends, pins extending from said hub, rubber mountings on said pins engaging said recesses, and means securing the two-parts of said inertia member together.

5. A vibration damper comprising a hub having a radially extending flanged portion provided with spaced recesses in a face thereof, pins extending in an axial direction through said flanged portion and said recesses and having shoulders formed thereon engaging said recesses to form a spacer, spacer members at the outer ends of said pins, rubber bushings on said pins between said spacer members and said shoulder portions, and an inertia member carried by said pins having recesses formed therein to engage said rubber bushings.

HERBERT E. OLSON.